No. 794,573.                                                Patented July 11, 1905.

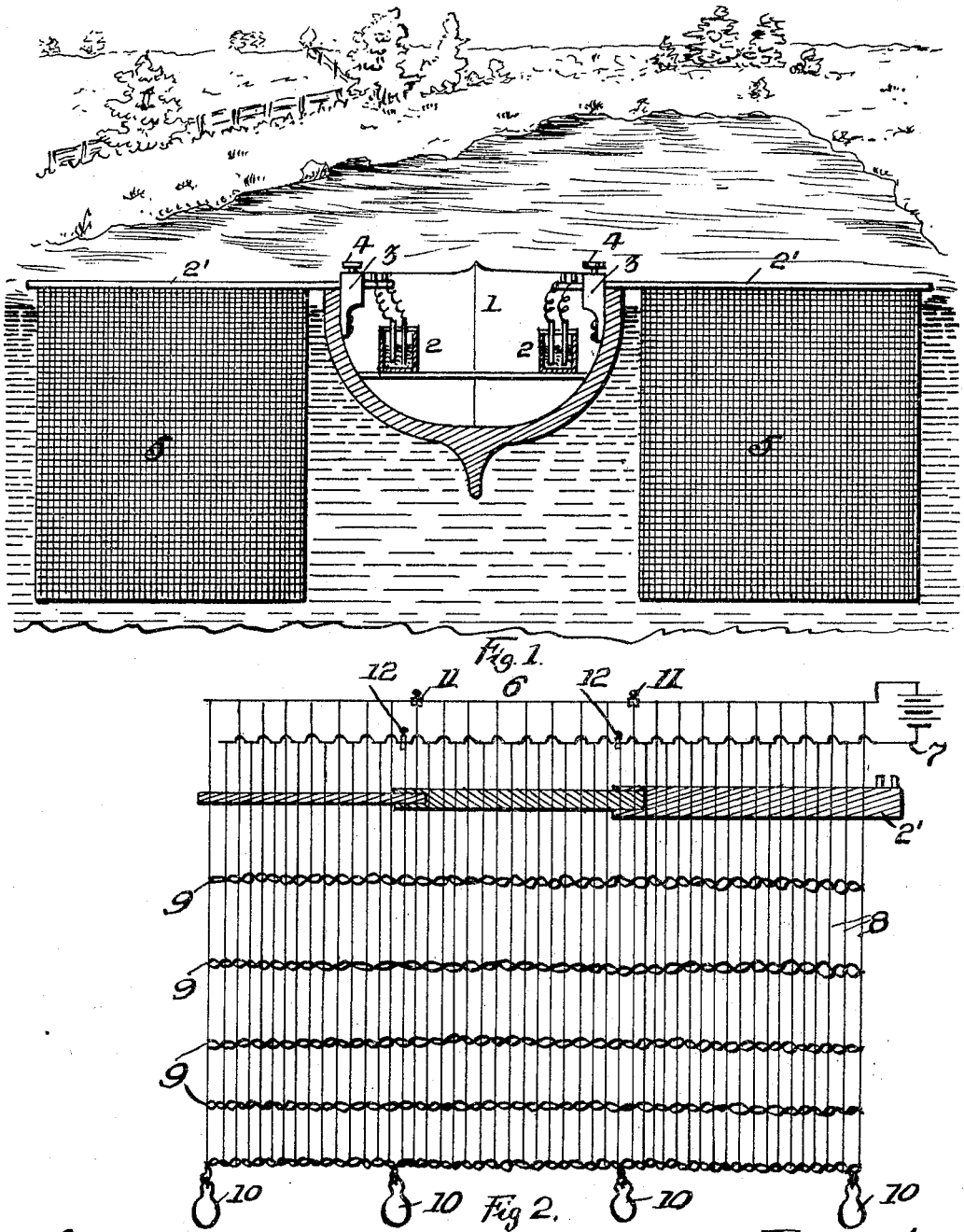

UNITED STATES PATENT OFFICE.

MICHAEL WARD, OF PITTSBURG, PENNSYLVANIA.

APPARATUS FOR CATCHING FISH.

SPECIFICATION forming part of Letters Patent No. 794,573, dated July 11, 1905.

Application filed March 8, 1905. Serial No. 249,009.

*To all whom it may concern:*

Be it known that I, MICHAEL WARD, a citizen of the United States of America, residing at Pittsburg, in the county of Allegheny and State of Pennsylvania, have invented certain new and useful Improvements in Apparatus for Catching Fish, of which the following is a specification, reference being had therein to the accompanying drawings.

This invention has relation to apparatus for catching fish, and has for its object the provision of novel means whereby the fish may be submitted to an electric shock while swimming in the water, so as to stun them and cause them to float on the surface of the water, where they may be readily picked up in hand-nets and deposited in a boat or on shore.

In carrying my invention into effect I provide a suitable vessel, such as a row-boat or a power-boat, with a suitable electrical generator or generators, and I suspend from the sides of the vessel a netting composed partly of electric conductors, such as metallic wires, which are placed in circuit with the electric generator or generators on the vessel, so that the fish coming in contact with such netting will be submitted to a shock of electricity, which will have the effect of stunning them and causing them to float on the top of the water, where they may be gathered up in hand-nets and deposited in the boat or on shore.

In the accompanying drawings I have illustrated my improvement, Figure 1 being a view of a body of water partly surrounded by land and showing in transverse sectional view a boat provided with my improved device for catching fish; and Fig. 2 is a diagrammatic view illustrating the peculiar construction of one of the nets which are employed, the net in this figure being in several separable sections.

In Fig. 1 of the drawings the boat, which, as before stated, may be of any desired character, is designated 1, and in the boat are mounted electric generators 2 2, which may be of any desired type, those shown in the drawings being primary batteries. On each side of the boat 1 is mounted a spar or boom 2', these spars or booms extending out laterally from the boat to any desired distance and being supported in brackets 3 3 and sustained in the brackets by set-screws 4 4, the spars being revoluble in the brackets when the set-screws are loosened, so as to permit the nets 5 5 to be wound around the spars when desired. The nets 5 5 are of peculiar construction, which will be best understood by reference to Fig. 2, in which the nets are illustrated in diagram, and the spars or boom by which they are supported are shown in longitudinal section, the latter being, as well as the nets, in sections, whereby the spar and the net may be lengthened or shortened, as will be presently described. The source of electric energy, which may be of any desired or appropriate character—such as a dynamo or magneto-generator or a storage or primary battery—is so connected to the net that the vertical strands thereof, which are bare or uncovered wires, will constitute terminals of conductors leading from the source of electric energy. Vertical strands of the net are alternately connected to the positive and to the negative poles of the battery, the wire leading from the positive pole of the battery being designated 6 and the wire leading from the negative pole of the battery being designated 7 and being led along the side of the spar 2' and insulated one from the other. The vertical strands 8 of the net are united by cross-strands 9 at suitable intervals, these cross-strands being composed of suitable insulating material, so that the vertical metallic strands of the net are electrically insulated from one another. The bottom of the net is provided with weights 10 10, which assist in sinking the net and maintaining it in a vertical position in the water.

The spar 2' may be composed of a single piece of suitable material, such as wood, or it may be composed of a number of separable sections, the end of one section socketing in a hole in the end of the next adjacent section, as illustrated in Fig. 2, and in this event the net is made in an equal number of sections, the conducting-wires 6 and 7 of the source of electric energy being connected together by screw-cups or connectors 11 and 12, respectively.

In carrying my invention into effect I bring the boat to a narrow portion of a stream or body of water and spread the nets transversely across such body of water, so as to cut off a considerable space of water on each side of the boat against the passage of fish. The fish in the body of water or stream which is thus guarded by the nets are startled by agitating the water or in any other suitable manner and will naturally take to flight and endeavor to leave the stream or body of water, and in so doing they will come into contact with the nets. As soon as a fish touches any two of the vertical strands of the net the fish will establish a circuit between such strands, and as these strands are alternately connected with the opposite poles of the battery or other electric generator the current of electricity from the battery will be transmitted from one strand to the other through the body of the fish, with the resultant effect that the fish will be stunned by the passage of the current of electricity through its body and will float upon the surface of the water in an inanimate condition, and they can then be readily gathered in hand-nets and placed in the boat or thrown on shore.

Various details in the construction of the apparatus may be changed without departing from the general spirit and scope of the invention.

What I claim, and desire to secure by Letters Patent, is—

1. In a device of the character described, the combination with a boat, of a source of electrical energy mounted on the boat, a spar extending from the boat, a net having strands of conducting material connected alternately to the opposite terminals of said source of electrical energy, substantially as described.

2. In a device of the character described, the combination with a boat, of a plurality of spars extending from the sides of the boat, each spar being composed of separable sections, a mesh carried by each said spar and having strands of conducting material arranged at proper intervals, a source of electrical energy carried by the boat, and electric connections between said source of electric energy and said net.

3. In a device of the character described, the combination of a boat, a plurality of spars extending in diverse directions from the boat, a net carried by each spar and having strands of conducting material spaced apart, a source of electric energy carried on the boat, certain of the strands of the net being connected to one of the poles, of the source of electrical energy and others of the strands of the nets being connected to the other pole of said source of electrical energy.

In testimony whereof I affix my signature in the presence of two witnesses.

MICHAEL WARD.

Witnesses:
H. C. EVERT,
E. E. POTTER.